P. J. O'SULLIVAN.
TUBE TESTER.
APPLICATION FILED OCT. 20, 1917.
1,273,914.
Patented July 30, 1918.
2 SHEETS—SHEET 1.
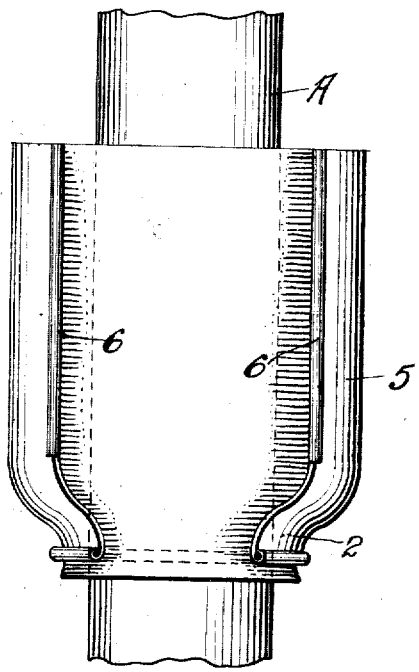
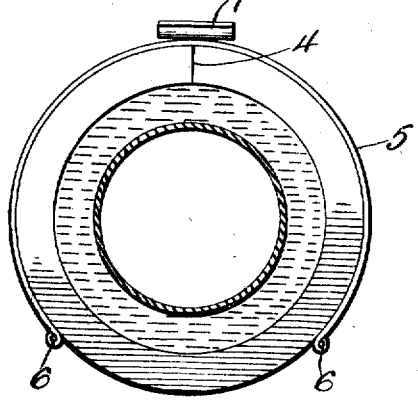
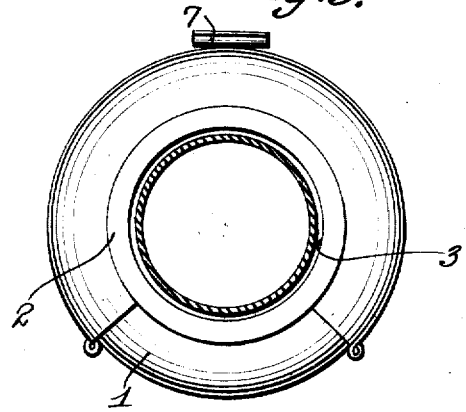
WITNESSES
Guy M. Spring
Wm. H. Mulligan
INVENTOR
Patrick J. O'Sullivan
BY Richard Bowen
ATTORNEY

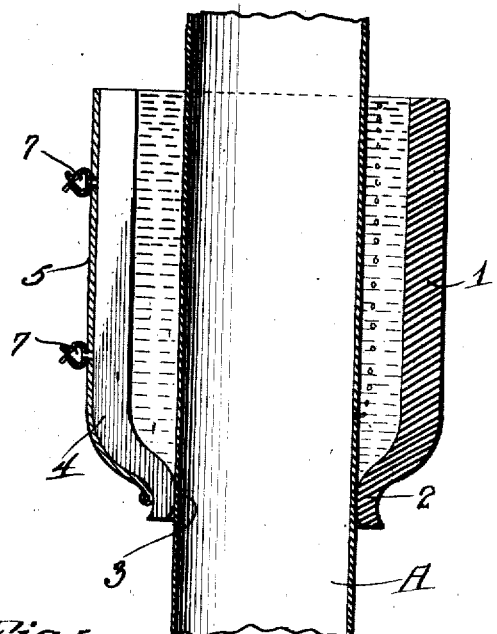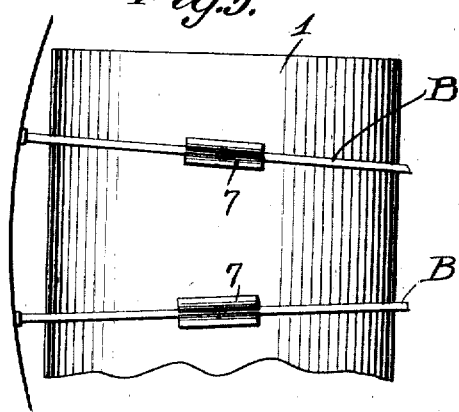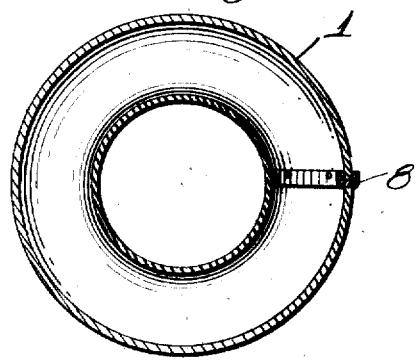

UNITED STATES PATENT OFFICE.

PATRICK J. O'SULLIVAN, OF KANTURK, IRELAND.

TUBE-TESTER.

1,273,914.    Specification of Letters Patent.    Patented July 30, 1918.

Application filed October 20, 1917. Serial No. 197,748.

*To all whom it may concern:*

Be it known that I, PATRICK J. O'SULLI-VAN, a subject of the King of Great Britain, residing at Kanturk, in the county of Cork, Ireland, have invented certain new and useful Improvements in Tube-Testers, of which the following is a specification.

This invention relates to testing devices and more particularly to a pneumatic tube tester, the primary object being to provide a device for ascertaining the location of small leaks in the pneumatic tube so that the leaks may be properly plugged.

One of the objects of the invention is to provide a device that may utilize a quantity of water in connection with the penumatic tube so that air bubbles will be created in the water when a portion of the tube having a leak therein is drawn through the device containing the water.

The invention also has an object to provide a device of this character that may be easily attached to the penumatic tube of the type commonly employed on automobile and bicycle tires so that it may be used in any emergency when repairs are to be made at the road side.

Another object of the invention is to provide a testing device of this character that will provide a receptacle for a quantity of water or be so constructed as to utilize the tube itself as a means for maintaining the water in position where the bubbles will be readily apparent when a leak is in the portion of the tube drawn through the water.

A further object of this invention is the provision of a tube tester which consists of comparatively few parts and is simple and durable in construction, but well adapted to withstand the rough usage to which devices of this character are usually subjected.

For a full description of the invention and the advantages and merits thereof, reference is to be had to the following description and the accompanying drawings, wherein is illustrated the preferred form of my invention, in which:—

Figure 1 is a side elevation of the device constructed in accordance with my invention and showing the same mounted on a fragment of a pneumatic tube.

Fig. 2 is a top plan view, the tube being shown in section.

Fig. 3 is a bottom plan view.

Fig. 4 is a vertical longitudinal section.

Fig. 5 is a fragmentary view illustrating the manner of mounting the device on the spoke of the wheel so that a puncture or leak may be mended.

Fig. 6 is a transverse sectional view illustrating a modified form of the device.

Referring to the drawing wherein is illustrated the preferred form of my invention, and in which like numerals of reference indicate corresponding parts throughout the several views, the cylindrical container 1 is preferably constructed from rubber or suitable rubberized fabric and one end is open and the opposite end is provided with a restricted neck 2 having a curved inner surface as indicated at 3. The diameter of the interior of this neck is such as to cause the neck to tightly embrace a pneumatic tube A when the latter is inflated. The interior diameter of the cylindrical container is large enough to receive a quantity of water as shown to advantage in Fig. 4 of the drawing. This rubber material from which the container is constructed is in the form of a single piece having its edges brought together in close contact as indicated at 4 in Fig. 2 of the drawing. In order that these edges may be held in that position I have provided a clamp 5 which consists of a rounded piece of thin spring material embracing the greater portion of the container and acting to grip the same so that the two contacting edges will be held together to maintain the container in operative position. The longitudinal edges of the clamp 5 are rolled as indicated at 6 thus providing a finger engaging bead for the purpose of facilitating manipulation of the clamp to permit it to be placed in position or disengaged from the container when the parts are to be demounted.

In the exact center of the clamp at a point near the contacting edges of the container I have provided a pair of clamps 7 which are of spring metal so that they may be engaged with the wire spoke B of the wheel of the bicycle so that the device may be held in position for permitting the operator to draw the pneumatic tube through the container when using the same.

In operation, the device will be assembled and filled with water after the tube has been placed in position.

Then by drawing the tube upwardly through the water a bubble will occur when a leak in the tube reaches the water. The tube, however, should not be drawn downwardly for this will cause the water to start leaking through the bottom of the container. It is desirable that a dry portion of the tube be drawn upwardly through the neck and into the water and in this manner a water tight joint at the neck 2 will be maintained during the operation of the device.

In Fig. 6 I have shown the container constructed from thin metal instead of rubber and the meeting edges are joined by a rubber casket 8 making a water tight joint at this point so that the use of the clamp 5 described in the above form is unnecessary.

From the foregoing it will be observed that a very simple and durable tube tester has been provided the details of which embody the preferred form. I desire it to be understood, however, that slight changes in the minor details of construction may be made without departing from the spirit of the invention or the scope of the claims hereunto appended.

Claims:

1. A tube tester comprising a container embracing the tube and having one end opened and including a neck in contact with the tube, the body of the container being spaced from the tube to receive a quantity of water.

2. In a tube tester, a rubber container formed from a single strip of material having its edges in contact to provide a water container, one end of the container having a restricted neck adapted to engage the tube, and means engaging the exterior of the container to hold the edges of the strip in close contact.

3. A tube tester comprising a flexible rubber container formed from a strip of material having its longitudinal edges in close contact, the lower portion of the said container being shaped to provide a restricted neck, adapted to have its inner surface engage the approximate surface of the inner tube, the latter providing a water tight joint at this point, whereby a quantity of water may be maintained within the container, and means to hold the said contacting edges of the said rubber material in close contact to prevent leaking of the water from the said container.

4. A tube tester comprising a container formed from a strip of water tight material shaped to form a cylinder having one end provided with a restricted neck and a diameter equal to the diameter of the inflated pneumatic tube, the interior of the said neck being curved to provide a curved surface for engaging the said tube, and means mounted on the container to hold the said material in the form of a cylinder for containing a quantity of water.

5. A tube tester comprising a container formed from a strip of water tight material shaped to form a cylinder having one end provided with a restricted neck and a diameter equal to the diameter of the inflated pneumatic tube, the interior of the said neck being curved to provide a curved surface for engaging the said tube, and means mounted on the container to hold the said material in the form of a cylinder for containing a quantity of water, the said means including a clamp plate embracing a portion of the said container and provided with a bead on each of its longitudinal edges.

In testimony whereof I affix my signature in presence of two witnesses.

PATRICK J. O'SULLIVAN.

Witnesses:
 DENIS O'MAHONEY,
 DENIS DALY.